May 28, 1968 H. WEINZINGER ET AL 3,385,089
DEVICE FOR RELIEVING UNDESIRABLE COMPRESSIVE
STRESSES IN MACHINES
Filed Oct. 12, 1965 2 Sheets-Sheet 2
FIG. 2
FIG. 3
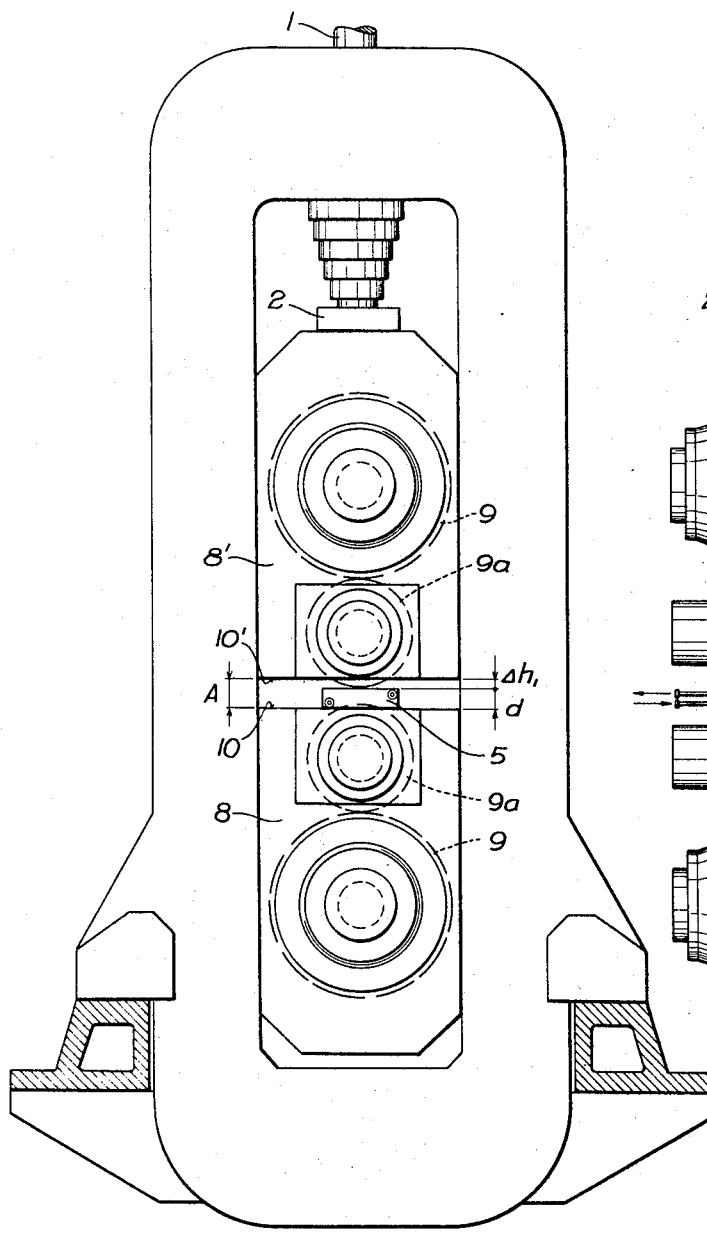
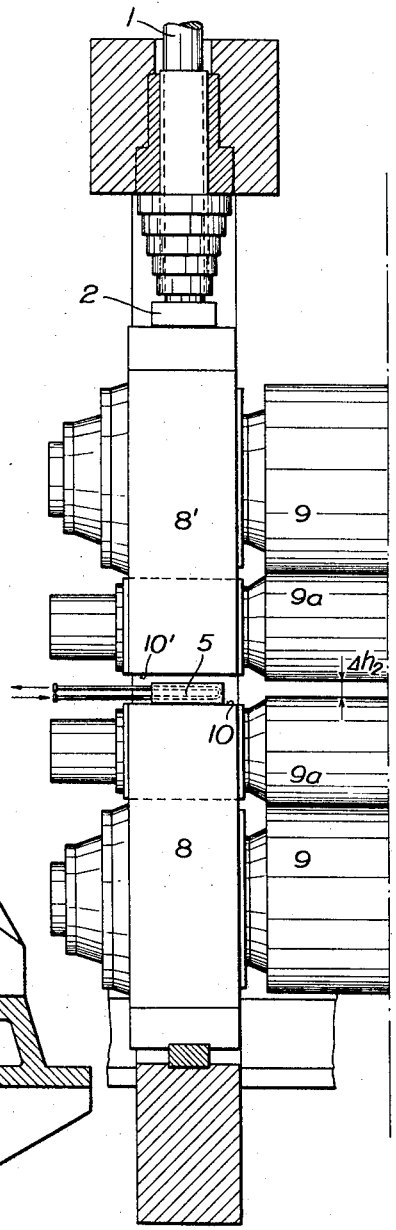
INVENTORS
HANS WEINZINGER and
GISWALT VEITL
BY
ATTORNEYS _United States Patent Office_

3,385,089
Patented May 28, 1968

3,385,089
DEVICE FOR RELIEVING UNDESIRABLE COMPRESSIVE STRESSES IN MACHINES
Hans Weinzinger and Giswalt Veitl, Linz, Austria, assignors to Vereinigte Österreichische Eisen- und Stahlwerke Aktiengesellschaft, Linz, Austria, a company of Austria
Filed Oct. 12, 1965, Ser. No. 495,174
Claims priority, application Austria, Oct. 13, 1964, A 8,701/64
6 Claims. (Cl. 72—244)

ABSTRACT OF THE DISCLOSURE

In the particular embodiments of the invention described herein, a member made of thermoplastic material is inserted between the components of a rolling mill stand, and a heating device is provided to soften the thermoplastic material when the stand is jammed. In one embodiment, two thermoplastic plates, disposed on opposite sides of a heating plate, are inserted between the upper and lower pressure plates for each screw spindle. Another embodiment utilizes a heating device embedded in a thermoplastic plate which is disposed between the upper and lower roll chocks.

---

Figure 1:
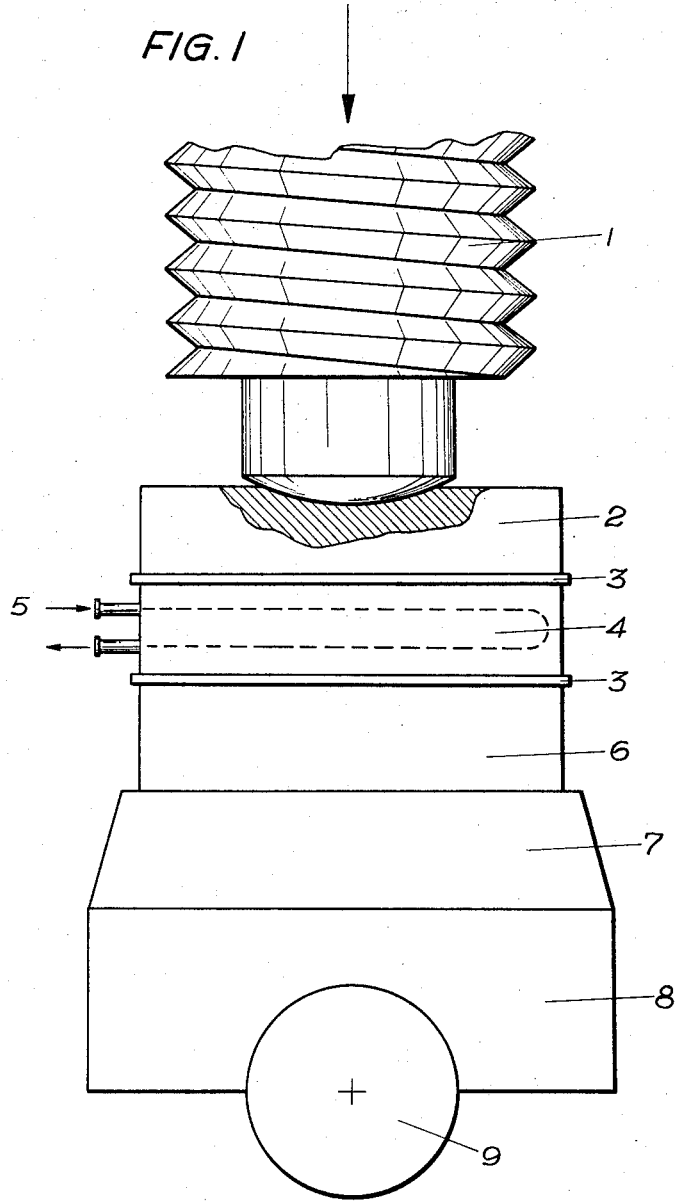

This invention relates to a device for relieving undesirable compressive stresses in machines having parts which are adapted to be adjusted relative to each other under pressure by means of a spindle or the like.

For the adjustemnt of machine parts, e.g. for screwing down the rolls of a roll stand, screw spindles are used which are operated by hand or electrically. It may happen that these spindles are jammed and can be released neither by hand nor by means of their driving motors because the torque produced by the motors is not sufficient. It is thus of importance to relieve the compressive stress exerted on the pressure screws, which has been effected, e.g., in roll stands by a destruction of the so-called breaker blocks of cast iron provided for this purpose. These breaker blocks are broken to pieces or cut autogeneously and have then to be replaced by new ones. Breaker blocks have a weight of 200 to 300 kg. per unit. Their destruction does not only cause a loss in material, but the procedure also takes several hours, thus resulting in a considerable loss of production.

For the protection of machine parts which are subjected to high pressure a device has moreover been known, which enables a relief of high compressive stresses when a predetermined pressure limit is exceeded. The known device comprises a pressure chamber including a plastic material, particularly caoutchouc, on which a piston acts. When the pressure limit is exceeded, the said material liquefies and flows off through a valve, whereby the compressive stresses are reduced. Devices of the kind described are complicated, however, and cannot be used for roll mills; their effect is uncertain due to various disturbing factors such as the volume expansion of the plastic material in the pressure chamber, its insufficient non-compressibility, the aging of the caoutchouc, eventual leakages at the piston and in the valves, and others.

In order to overcome the disadvantages and difficulties described, the present invention proposes an improved device for relieving undesirable compressive stresses in machines, such as roll stands, which is characterized in that at least one intermediate member, preferably of plate form, consisting of a material, whose compression strength is sufficiently reduced upon heating above the normal operating temperature and which has a sufficiently high cold compression strength, is arranged either in the range of compressive stresses of the screw spindles or between stops provided on the relatively adjustable machine parts. Suitable materials for the purpose of the invention are thermoplastic synthetics, preferably resins on metacrylate basis, e.g. the synthetic material "Plexidur DIN 53 454." At room temperature, this material has a compression strength of 1400 kp./cm.$^2$, with a minimum deformation which is insignificant regarding the dimensional accuracy of the rolling product. The specified synthetic material has a deformability which increases in the measure of the temperature rise and which goes as far as fluidity, as in the case of all thermoplasts. The deformability required for the present purpose is reached already at relatively low temperatures so that one can manage with warm or hot water.

In the event of the above-mentioned jamming occurring in a screw-down spindle having the plate of synthetic material provided—according to one embodiment of the invention—in the range of compression stresses of that spindle, a short heating of the intermediate member of thermoplastic synthetic material by means of hot water or hot air will suffice for relieving the excessive compressive stress on the spindle until it is possible to release the blocked parts by hand or by the driving motors. Subsequently, the synthetic material recovers its original compression strength by cooling either naturally or preferably artificially, e.g. by means of cold water or cold air, so that the material and the plate (the intermediate member) made of it, respectively, is capable of stress transmission. Experience has shown that this heating and subsequent cooling procedure does not result in a lasting deformation due to a flowing of the material.

According to another feature of the invention, the said intermediate member (the plate) contains a heating and cooling device, particularly in the form of a pipe coil for circulating a heating or cooling medium. It is likewise possible to arrange this heating and cooling device adjacent to the intermediate member of thermoplastic material in such manner that the heating and cooling, respetcively, of the intermediate member can be effected by thermal conduction. Preferably the mentioned heating and cooling system is arranged in an intermediate plate of conductive material having a sufficiently high compression strength such as steel, which intermediates plate is in contact on both sides with two intermediate members consisting of thermoplastic material.

A second embodiment of the invention, wherein the intermediate member is arranged between stops provided on relatively adjustable parts, may be put into best effect in roll stands in such manner that this intermediate member comes to lie between the upper end face of the lower chock and the lower end face of the upper chock of the roll stand. Suitably, the distance between the stops is chosen to be smaller than the thickness of the intermediate member plus the maximum screw-down path between the machine parts so that the intermediate member comes into pressure contact with the stops before the adjustable machine parts come into pressure contact with each other. This embodiment has the advantage that the plate of synthetic material, in normal rolling operation, is not subjected to any pressure load, whereby a longer life is achieved.

The invention is explained in more detail by way of two embodiments illustrated in the drawing, in which FIG. 1 shows the embodiment with arrangement of a synthetic plate of thermoplastic material in the range of compressive stresses of a spindle, and FIGS. 2 and 3 illustrate the arrangement of such a plate between stops. FIG. 2 is a front view of a roll stand, and FIG. 3 a lateral view.

Referring to FIG. 1, a screw spindle 1 is provided for screwing down the rolls in a roll stand and driven by a motor (not shown). This spindle 1 acts, through a ball seat, on an upper pressure plate 2, under which one of the two thermoplastic plates is arranged, designated by 3. Adjacent to this plate there is a heating and cooling plate 4 which contains a pipe coil with connections 5 for the supply and discharge of a heating and cooling medium. Then follows the second thermoplastic plate 3, then the lower pressure plate 7, a pressure gauge 6 for measuring the roll pressure being provided therebetween, if desired. The pressure is then transmitted to the roll bearings 8 and to the rolls 9. This arrangement of the heating and cooling plate between two thermoplastic intermediate members in accordance with the preferred embodiment of the invention has the advantage that the heating and cooling action can be transferred to the metallic machine parts only very slowly, due to the poor thermal conductivity of the thermoplastic materials adjoining on both sides, and that its influence is limited to the intermediate members of thermoplastic material. In the case where only one thermoplastic intermediate plate is used, the heating and cooling system may be disposed in the plate itself, e.g. in the form of a pipe coil. Of course, the heating may be also effected by means of inserted electrical resistors, in which case the re-cooling may be accomplished naturally or by provision of a cooling plate supplied only with a cooling agent.

The use of pressure gauges for measuring the roll pressure bears the further advantage that, due to the thermoplastical deformability of the intermediate members, a uniform adjustment of the abutting pressure faces between pressure gauge and pressure pieces, which is a requirement for the successful measuring function, is achieved without a special surface treatment (machining).

In the second embodiment according to FIGS. 2 and 3, which diagrammatically show a roll stand, numeral 9 denotes the back-up rolls and numeral 9a the work rolls, the maximum screw-down path between the work rolls 9a, which is present before a jamming of the rolls occurs, being designated by $\Delta h_2$. The two lower rolls (back-up roll and work roll) are supported with their necks in the lower chock 8, and the two upper rolls (work roll and back-up roll) are supported in the upper chock 8'. Between the lower end face 10' of the upper chock 8' and the upper end face 10 of the lower chock 8 the distance A is provided. Arranged therebetween is the intermediate member 5 in the form of a plate, the thickness of which is indicated at $d$. As is evident, the end faces 10 and 10' serve as stops for the intermediate member 5, when the rolls are approached to each other. Between the intermediate member 5 and the end face 10' a distance $\Delta h_1$ remains free. This distance $\Delta h_1$ is smaller than $\Delta h_2$, or in other words, the distance A is smaller than the total of the thickness $d$ of the intermediate member and the screw-down path $\Delta h_2$. In this manner, the synthetic plate 5 is under no compressive stress, during normal roll operation, but comes into pressure contact with the stops before the stopping path $\Delta h_2$ is completely traversed. The intermediate member prevents also any unintentional and undesirable contacting of the rolls, eliminates jamming and thereby damages to the rolls and to the roll bearing, and provides a high operational safety. As the intermediate member may be provided at an easily accessible place, an easy mounting and replacing is enabled. It is moreover possible to mount intermediate members of the described kind in existing roll mills without complicated changes and adjustments being necessary.

What we claim is:

1. A device for relieving undesirable compressive stresses in machines having parts which are relatively adjustable under pressure by adjustment means, said device comprising at least one intermediate member containing thermoplastic material having a compression strength at the normal working temperature of the adjustment means which is high enough to resist appreciable deformation at the pressures applied by the adjustment means, the thermoplastic material being responsive to heating at a temperature greater than the normal working temperature of the adjustment means to cause the material to be deformed by the pressure applied by the adjustment means.

2. A device as set forth in claim 1 wherein said intermediate member consists of a plate of thermoplastic material and comprises a heating and cooling device for circulating a coolant.

3. Apparatus comprising at least two parts which are relatively adjustable under pressure, adjustment means for adjusting the relative positions of the parts and including two opposed surfaces and an intermediate member disposed between the two opposed surfaces of the adjustment means and containing thermoplastic material having a compression strength at the normal working temperature of the adjustment means which is high enough to resist appreciable deformation at the pressures applied by the adjustment means, the thermoplastic material being responsive to heating at a temperature greater than the normal working temperature of the adjustment means to cause the material to be deformed by the pressure applied by the adjustment means.

4. Apparatus as set forth in claim 3, wherein the apparatus comprises a roll stand including a lower chock having an upper end face and an upper chock having a lower end face and wherein said intermediate member is designed as a plate and is arranged between the upper end face of the lower chock and the lower end face of the upper chock of a roll stand.

5. Apparatus as set forth in claim 3, wherein the distance between the opposed surfaces is smaller than the thickness of the intermediate member plus the maximum adjustment path between the adjustable parts so that the intermediate member comes into pressure contact with the opposed surfaces before the adjustable parts come into pressure contact with each other.

6. Apparatus as set forth in claim 3, wherein the intermediate member comprises a heating and cooling device for circulating a coolant.

References Cited

UNITED STATES PATENTS

| 2,236,464 | 3/1941 | Burns | 72—248 |
| 2,363,656 | 11/1944 | Dawson | 72—237 |

CHARLES W. LANHAM, *Primary Examiner.*

A. RUDERMAN, *Assistant Examiner.*